United States Patent [19]
Sato et al.

[11] Patent Number: 5,072,162
[45] Date of Patent: Dec. 10, 1991

[54] SPEED CONTROLLER AND INSTRUMENT HAVING THE SAME

[75] Inventors: Osamu Sato, Hiki; Fumio Mochida, Maebashi, both of Japan

[73] Assignee: Canon Kabushiki Kaisha, Tokyo, Japan

[21] Appl. No.: 493,294

[22] Filed: Mar. 14, 1990

[30] Foreign Application Priority Data

Mar. 14, 1989 [JP] Japan ................... 1-59589

[51] Int. Cl.$^5$ .................... H02P 5/00; G03B 3/10
[52] U.S. Cl. ........................ 318/268; 358/202; 358/227; 358/228; 352/216
[58] Field of Search ............ 318/254, 138, 439, 268, 318/269, 272; 352/140, 216; 358/199, 202, 205, 206, 213.19, 227, 228, 479, 906, 909; 346/160; 360/69, 73.01, 73.04, 73.03

[56] References Cited

U.S. PATENT DOCUMENTS

| 4,317,072 | 2/1982 | Goof et al. ............. 318/254 X |
| 4,403,174 | 9/1983 | Miyazaki et al. ............ 318/254 |
| 4,647,979 | 3/1987 | Urata ........................ 358/227 |
| 4,660,091 | 4/1987 | Nutting ................... 358/228 X |
| 4,669,841 | 6/1987 | Kaneko et al. ............ 352/216 |
| 4,695,887 | 9/1987 | Peterson .................. 352/216 X |
| 4,699,483 | 10/1987 | Swinehart ................ 352/216 |

FOREIGN PATENT DOCUMENTS

| 0273319 | 7/1988 | European Pat. Off. . |
| 3325135 | 2/1984 | Fed. Rep. of Germany . |
| 56-51729 | 5/1981 | Japan . |
| 58-133196 | 8/1983 | Japan . |
| 59-172629 | 9/1984 | Japan . |
| 60-229691 | 11/1985 | Japan . |
| 87/06720 | 11/1987 | PCT Int'l Appl. . |

Primary Examiner—Bentsu Ro
Attorney, Agent, or Firm—Fitzpatrick, Cella, Harper & Scinto

[57] ABSTRACT

A speed controller includes a drive source, an input device for inputting the driving speed information of the drive source, a driver for driving the drive source on the basis of the driving speed information input by the input device, a detector for linearly detecting the amount of movement of the drive source, an output device for outputting movement amount information obtained by the detector, and a corrector for correcting the driving speed information by the use of the movement amount information obtained by the detector, the corretor imparting new driving speed information as the corrected value to the driver.

7 Claims, 5 Drawing Sheets

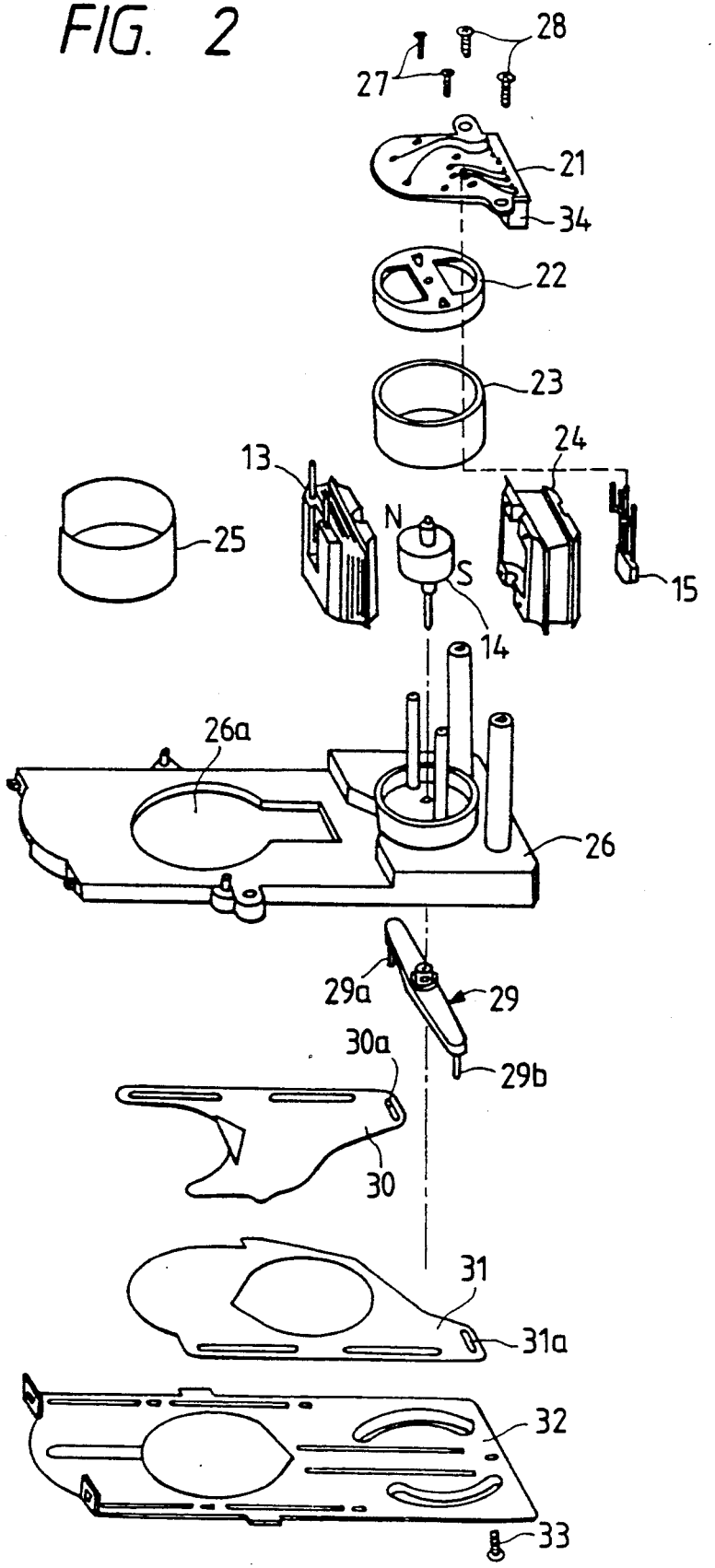

SPEED CONTROLLER AND INSTRUMENT HAVING THE SAME

BACKGROUND OF THE INVENTION

1. Field of the Invention

The present invention concerns a speed control device of a motor.

2. Related Background Art

In a speed controller according to the prior art, as shown in FIG. 5 of the accompanying drawings, a motor unit for driving a light amount control member has a differential amplifier 1 for comparing a speed setting voltage with a speed control signal, a driving coil 3 for rotating a rotor magnet 4 by a signal from a power amplifier 2 for receiving as an input a speed error signal output from the differential amplifier 1, a braking coil 6 for detecting and controlling the rotational speed of the rotor magnet 4 for driving the light amount control member, and a magneto-responsive element 5 for detecting the aperture value. An output signal from the braking coil 6 is input as a speed control signal to the differential amplifier 1 through a signal amplifier 7 and a signal from the magneto-responsive element 5 is output as an aperture value detection signal through a signal amplifier 8.

The braking coil 6 for detecting the rotational speed of the rotor magnet 4 has been used for the detection of the driving speed of the light amount control member. Also, the braking coil 6 utilizes the counter electromotive voltage from the rotation of the rotor magnet 4 and therefore has been very low in sensitivity. Further, to increase the sensitivity, the number of turns of the braking coil 6 must be made very large with the result that the size of the motor unit becomes large, and in order that the size of the motor unit may not become large, it has been necessary to wind the coils around a brakable thin conductor.

Also, in a system for detecting the rotational speed of the rotor magnet by the braking coil, there has been, in addition to the counter electromotive voltage by the rotor magnet 4 being utilized for the braking coil 6, a problem that the mutual induction by the driving coil 3 adjacent thereto affects the rotational speed detection signal thereof to readily cause oscillation.

SUMMARY OF THE INVENTION

One aspect of this invention is the provision of a speed controller in which the output signal of a magneto-responsive element capable of linearly detecting the amount of rotation of a rotor magnet is used for the control of the rotational speed of the rotor magnet, whereby the braking coil of a motor can be eliminated.

BRIEF DESCRIPTION OF THE DRAWINGS

FIG. 2 is an exploded perspective view of a driving unit for the speed controller.

DESCRIPTION OF THE PREFERRED EMBODIMENT

A first embodiment of the present invention will hereinafter be described with reference to FIGS. 1 to 4.

Figure 1:
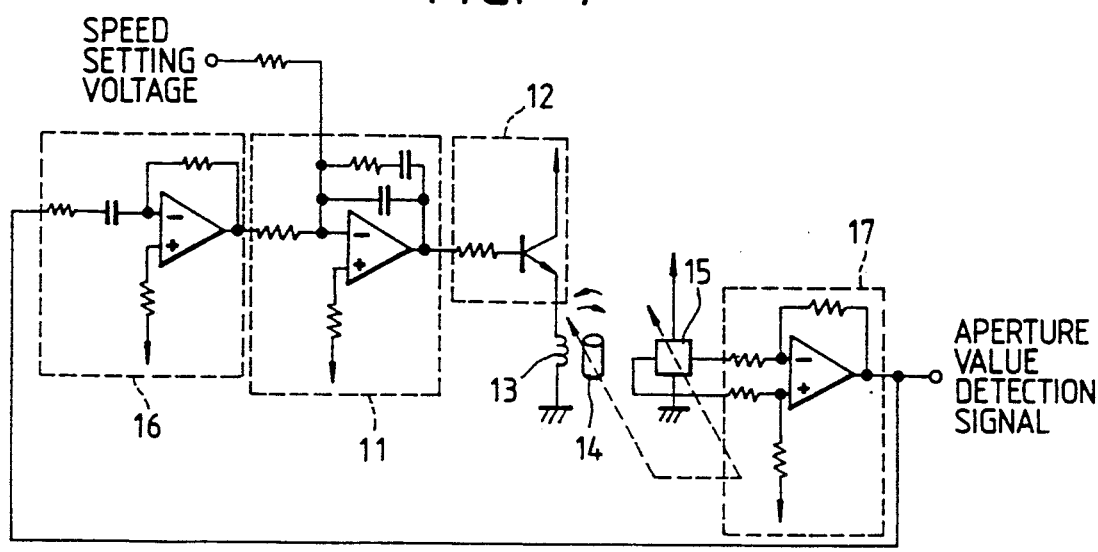
FIG. 1 shows a circuit construction for the control of the operation of a speed controller according to an embodiment of the present invention.
Figure 5:
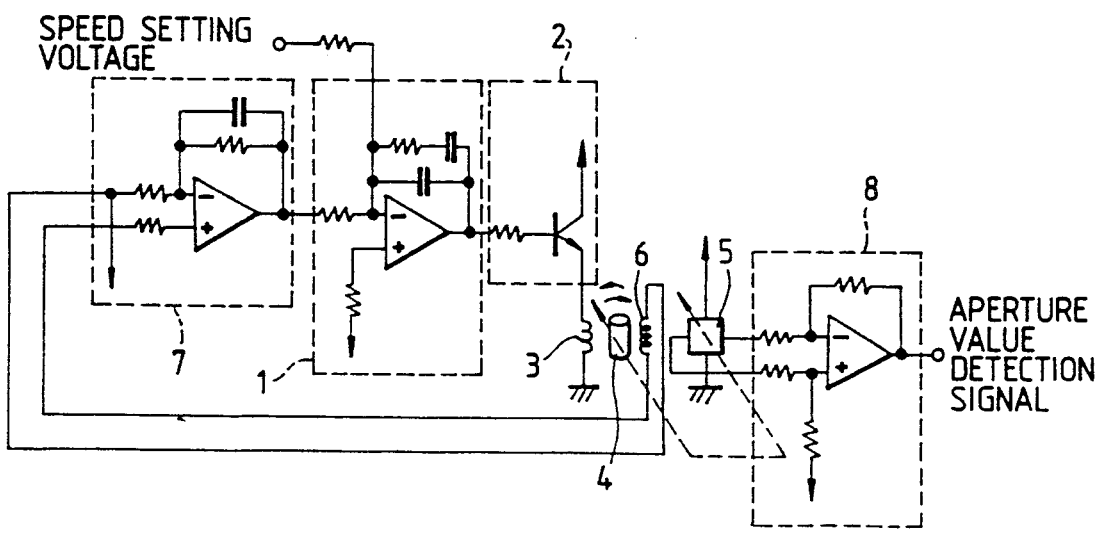
FIG. 5 shows a circuit construction for the control of the operation of a light amount aperture device according to the prior art.

Referring to FIG. 1 which is a circuit diagram showing the construction of the present embodiment, the reference numeral 11 designates a differential amplifier for comparing a speed setting voltage with a speed control signal (voltage), the reference numeral 12 denotes a power amplifier for converting a speed error signal output from the differential amplifier 11 into a signal for driving a rotor magnet 14, and the reference numeral 13 designates a driving coil for rotating magnet the rotor magnet 14 by an output signal from the power amplifier 12. The rotor magnet 14 (two-pole magnetized) drives a light amount control member by the rotation thereof. The reference numeral 15 denotes a magneto-responsive element (Hall device) for detecting the position of the rotor magnet 14. The reference numeral 16 designates a signal amplifier for converting an output signal from the magneto-responsive element 15 passed through a signal amplifier 17 and output from the signal amplifier 17 into a speed control signal. The speed control signal is input to the differential amplifier 11. The reference numeral 17 denotes a signal amplifier for receiving the output signal from the magneto-responsive element 15 as an input and amplifying it.

FIG. 2 shows an exploded perspective view of a light amount control driving unit.

In FIG. 2, the reference numeral 21 designates a substrate for solder-coupling the driving coil 13 and the terminal of the magneto-responsive element 15 together. A connector 34 is solder-coupled to the substrate, and the connector 34, the magneto-responsive element 15 and the driving coil 13 conduct by a pattern provided on the substrate 21. The reference numeral 22 denotes a cap held by the substrate 21 and serving also as an upper bearing for the rotor magnet 14, the reference numeral 23 designates a yoke cooperating with the rotor magnet 14 to form a magnetic circuit, the reference numeral 24 denotes a support bed to which the magneto-responsive element 15 is fixed, the reference numeral 25 designates a tape for fixing the driving coil 13 and the support bed 24, and the reference numeral 26 denotes an aperture ground plate for supporting on one surface thereof a motor unit comprising the driving coil 13, the rotor magnet 14, the magneto-responsive element 15 and the yoke 23 between itself and the substrate 21 mounted by means of screws 27 and 28 and supporting light amount control members 30 and 31 on the other surface thereof. The aperture ground plate 26 has an opening 26a therein. The reference numeral 29 designates a driving arm for transmitting the rotation of the rotor magnet 14 to the light amount control members 30 and 31. The driving arm 29 is mounted on the rotary shaft of the rotor magnet 14 which protrudes to the other surface of the aperture ground plate 26, and has pins 29a and 29b studded on the opposite ends thereof. The light amount control members 30 and 31 have slots 30a and 31a formed in one end edge portion thereof, and the pins 29a and 29b of the driving arm 29 are engaged with the slots 30a and 31a, respectively, so that the light amount control members may be mutually moved by the rotation of the driving arm 29 so as to control a light passing through the opening 26a in the aperture ground plate 26. The reference numeral 32 denotes a lid for preventing the light amount control members 30 and 31 from falling off. The lid 32 is attached to the aperture ground plate 26 by means of a screw 33. The reference numeral 34 designates a connector for connecting the light amount control driving unit to a lead wire (not shown) from a control circuit.

In the present embodiment constructed as described above, a speed setting voltage as a light amount error signal first passes through the differential amplifier 11 and the power amplifier 12 to electrically energize the driving coil 13, whereby the rotor magnet 14 is rotated by a predetermined angle. This rotation of the rotor magnet 14 is detected by the magneto-responsive element 15, and the output signals from the magneto-responsive element 15 pass through the signal amplifier 17, and one of the output signals is used as an aperture detection signal (a signal representative of the F-value) and the other output signal is input to the signal amplifier 16. A speed control signal (see FIG. 4B) output from the signal amplifier 16 is fed back to the differential amplifier 11 and is compared with the speed setting voltage, and the aforedescribed operation is repeated until the difference therebetween becomes null, and finally the rotor magnet 14 is rotated at a set speed. That is, the speed control signal, when the variation in speed is too large, imparts that information as a voltage of the opposite phase to the differential amplifier 11, whereby the differential amplifier 11 outputs to the power amplifier 12 a voltage averaged with respect to the difference from the speed setting voltage.

When the rotor magnet 14 is rotated, the driving arm 29 coupled to the rotary shaft thereof in FIG. 2 is rotated and the light amount control members 30 and 31 are moved in opposite directions to thereby control the amount of light passing through the opening 26a in the aperture ground plate 26. Any sudden variation in the amount of light by the light amount control member 30 is suppressed by speed control, whereby hunting is prevented.

Figure 3:
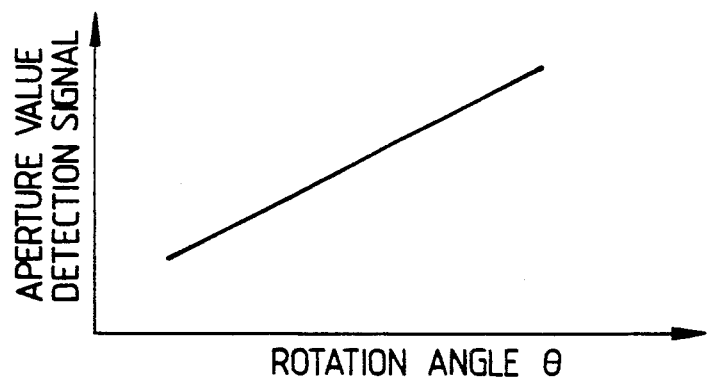
FIG. 3 is a graph showing the relation between the rotation angle of a rotor magnet and an aperture value detection signal.
Figure 4A:
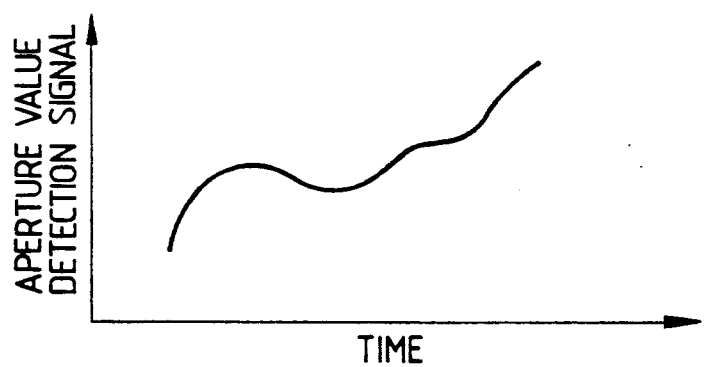
FIG. 4A is a graph showing the relation between time and the aperture value detection signal.
Figure 4B:
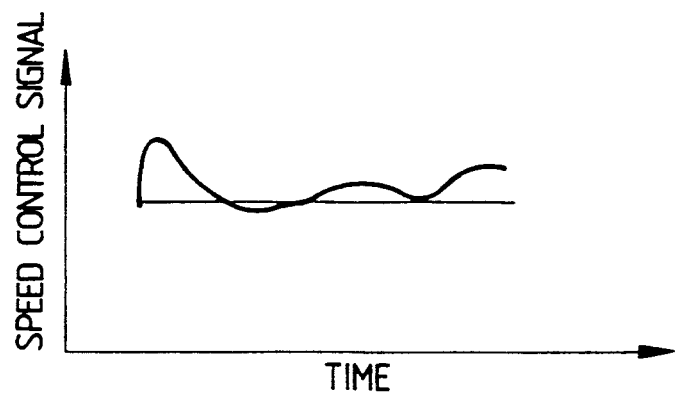
FIG. 4B is a graph showing the relation between time and a speed control signal.

Here, the aperture value detection signal output from the signal amplifier 17 is linearly varied relative to the rotation angle θ (less than 80°) of the rotary magnet 14, as shown in FIG. 3, by being detected by the magneto-responsive element 15 within a range which does not exceed the peak of the N or S pole magnetized on the rotor magnet 14. The detection of the rotary angle of the rotor magnet 14 by the magneto-responsive element 15 in the present embodiment is characterized in that a linear variation is detected to the last. Accordingly, it basically differs from the heretofore known method in which a Hall device is utilized to detect not the number of rotations of the rotor i.e., the linear rotation angle, but the frequency of appearance of the peak of the wave-like output outputted from the Hall device. Assuming that the aperture value detection signal varies relative to time as shown in the graph of FIG. 4A, that signal will pass through the differentiation circuit of the signal amplifier 16 and become such a speed control signal as shown in FIG. 4B.

In the present embodiment, as described above, the output signal of the magneto-responsive element is used not only as the aperture value detection signal, but also for the control of the rotational speed of the rotor magnet of the motor unit which drives the light amount control members, whereby a braking coil for controlling the rotational speed of the rotor magnet can be eliminated and thus, the manufacturing cost of the apparatus can be reduced, and the breakage of the coil wire caused by the use of the braking coil can be eliminated and the wiring of the substrate becomes easy. Also, the output signal of the Hall device is hardly affected by the driving coil and can be made into a stable signal having very little noise. Further, due to the elimination of the braking coil, the driving coil can also be wound in the space where the braking coil has been conventionally wound and therefore, the power-up of driving or a low electric current and a low voltage can be achieved, or even if the magnet is made smaller, similar power can be obtained and the entire apparatus can be made compact. The compactness of the apparatus also leads to the light weight of the apparatuses.

A video camera system incorporating the above-described speed controller therein will now be described with reference to FIGS. 6 and 7.

Figure 6:
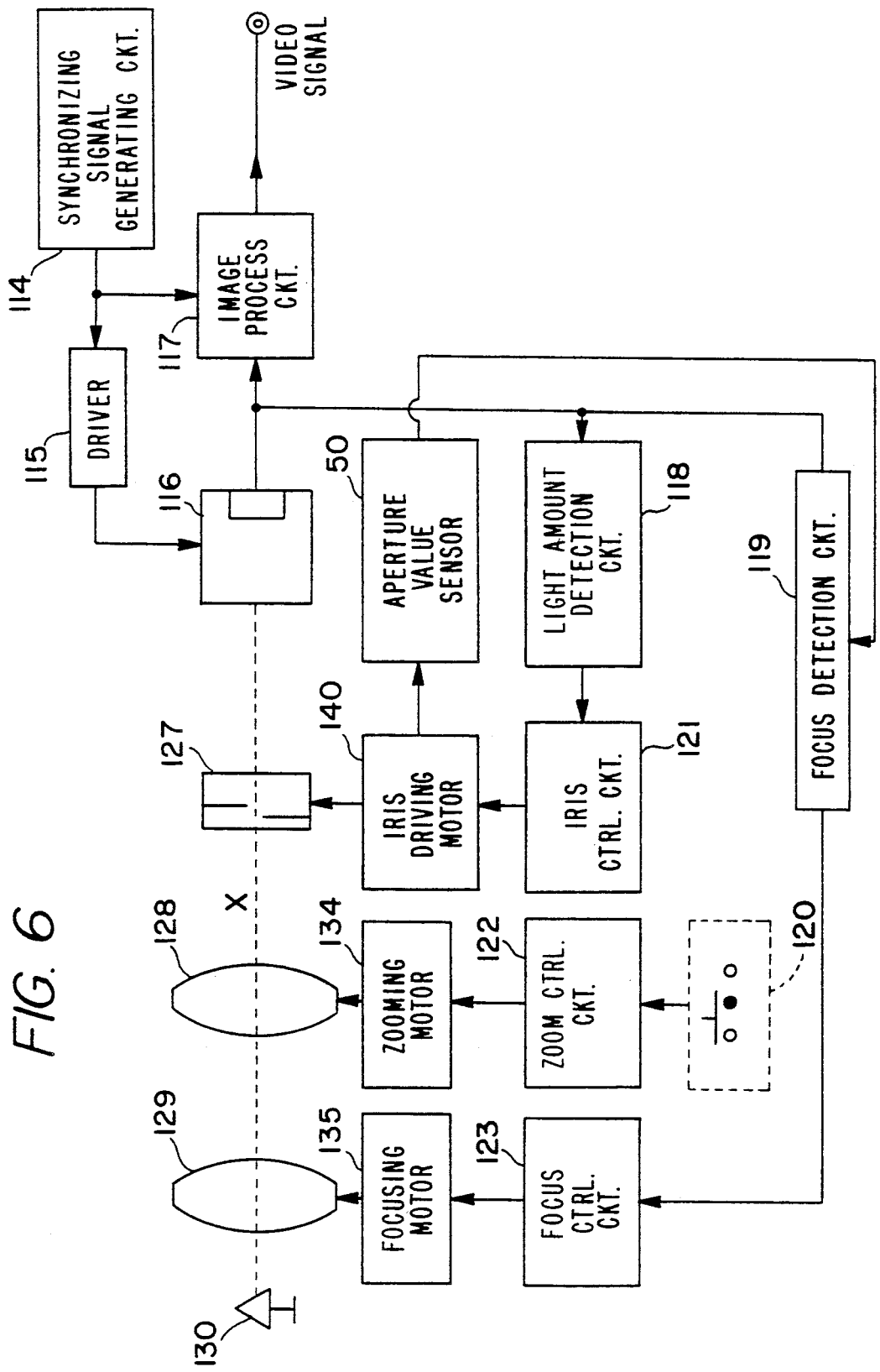
FIG. 6 is a construction diagram showing the speed controller of the embodiment as it is incorporated in a video camera.
Figure 7:
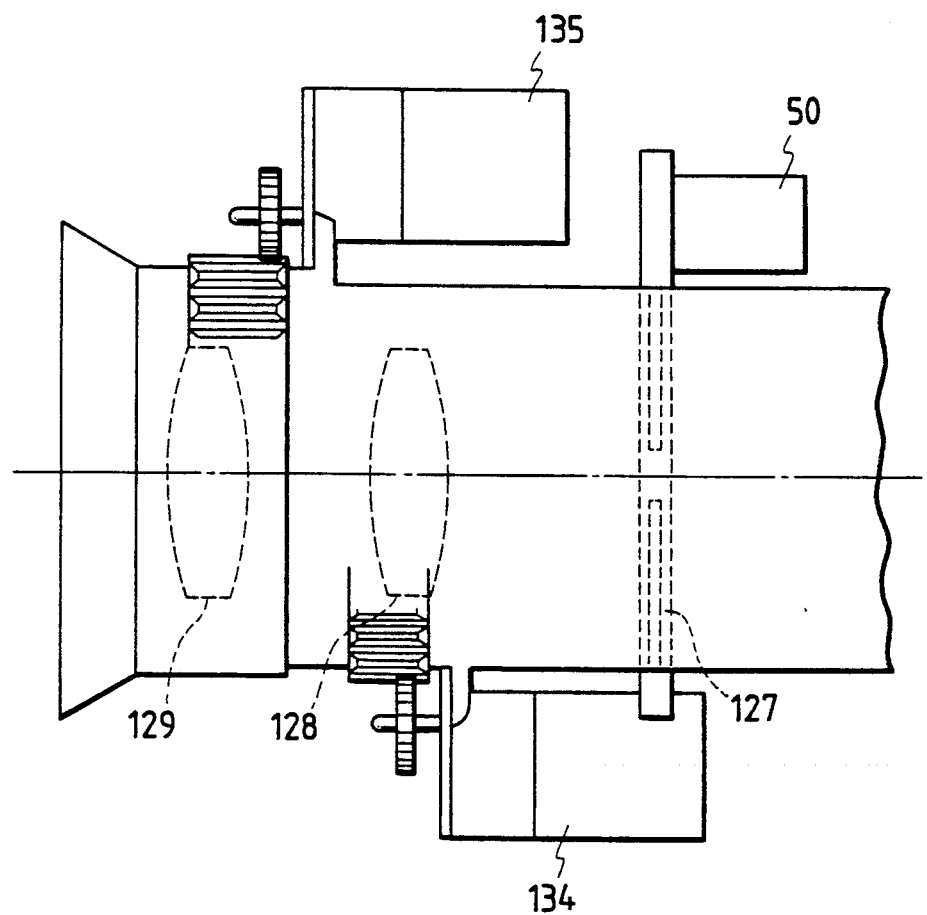
FIG. 7 shows the mechanical construction of only the lens portion in FIG. 6.

FIG. 6 shows the construction of the essential portions of the video camera system, and FIG. 7 shows the mechanical construction of only the lens unit. The reference numeral 114 designates a timing and synchronizing signal generating circuit, the reference numeral 115 denotes a driver for driving a CCD 116 in accordance with the timing of the timing and synchronizing signal generating circuit 114, the reference numeral 116 designates a CCD for converting a light signal into an electrical signal, the reference numeral 117 denotes an image processing circuit for processing the output of the CCD 116 into a video signal in accordance with the output of the timing and synchronizing signal generating circuit 114, the reference numeral 118 designates a light amount detection circuit for processing the output of the CCD 116 into a light amount control signal, the reference numeral 119 denotes a focus detection circuit for receiving the output of the aperture value sensor 50 and using the output of the CCD 116 as a focus control signal, the reference numeral 120 designates a manually operated switch for making a zoom control signal, the reference numeral 121 denotes an iris control circuit for adding the output of the timing and synchronizing signal generating circuit 114 and the output of the light amount detection circuit 118 together and making an iris driving signal, the reference numeral 122 designates a zoom control circuit for adding the output of the timing and synchronizing signal generating circuit 114 and the output of the manually operated switch 120 together and making a zooming motor driving signal, the reference numeral 123 denotes a focus control circuit for adding the output of the timing and synchronizing signal generating circuit 114 and the output of the focus detection circuit 119 together and making a focusing motor driving signal, the reference numeral 140 designates an iris driving motor unit (see FIG. 2) for receiving the output of the iris control circuit 121 and drive-controlling a light amount control member 127. The iris driving motor 140 is driven by an iris driving signal from the iris control circuit 121 and controls the light amount control member 127 for adjusting the amount of incident light into the CCD 116, as shown in FIG. 6. The zoom control circuit 122 drives and controls the zooming motor 134 to drive the zoom lens 128 in the direction of the optical axis x, thereby changing the magnification of the image projected to the CCD 116, as also shown in FIG. 6. The focus control circuit 123 drives and controls the focusing motor 135 to drive the focus lens 129 thereby adjusting the in focus state of the image projected to the CCD 116, as further shown in FIG. 6. Reference numeral 134 denotes a zooming motor for receiving the output of the zoom control circuit 122 and drive-controlling a zoom lens 128, the reference numeral 135 designates a focusing motor for receiving the output of the focus control circuit 123 and drive-controlling focusing lens 129, the reference numeral 127 denotes a light amount control member (see FIG. 2) for controlling the amount of light entering the CCD 116, the reference numeral 128 designates a zoom lens for controlling the magnification of an image projected onto the CCD 116, the reference numeral 129 denotes a focusing lens for controlling the focus of the image formed on the CCD 116, and the reference numeral 130 designates an object to be photographed. The reference numeral 50 denotes an aperture value sensor (the output of the signal amplifier 17 of FIG. 1) for linearly detecting any variation in the aperture value (F-value).

In the above-described construction, the light from the object 130 to be photographed (reflected light having image information) passes through the focusing lens 129, the zoom lens 128, the light amount control member 127, etc. and is imaged on the CCD 116, whereby it is converted into an electrical signal. In accordance with the output of the timing and synchronizing signal generating circuit, the driver 115 drives the CCD 116 and causes it to output signals successively, and the image processing circuit 117 processes these signals into video signals in accordance with the output of the timing and synchronizing signal generating circuit. The output signals of the CCD 116 are processed into a light amount control signal and a focus control signal by the light amount detection circuit 118 and the focus detection circuit 119, respectively. A determination of whether the apparatus is in an in-focus state is made by the focus detection circuit 119 by adding thereto the depth of focus based on the opening amount of the aperture (F-value). Also, a zoom control signal is made by the manually operated switch 120. The iris control circuit 121, the focus control circuit 123 and the zoom control circuit 122 add the signal of the timing and synchronizing signal generating circuit 114 to the light amount control signal and make a driving signal to drive the iris driving motor unit 40, the focusing motor 135 and the zooming motor 134 at a low speed, thereby controlling the light amount control member 127, the focusing lens 129 and the zoom lens 128 highly accurately. As regards the driving of the iris driving motor unit 140, the value of the light amount detection circuit 118 is compared with a predetermined value (proper luminance), and as the difference therebetween becomes greater, the iris driving motor unit 140 is driven in a proper direction at a higher speed. The effect resulting from the speed controller shown in FIGS. 1 and 2 being used in the above-described video camera system is not only the compactness of the apparatus provided by the elimination of the braking coil. For example, in the prior art, the resonance phenomenon occurring in the driving coil the braking coil due to high-band noise may sometimes become the noise during video camera photography, but by the braking coil being eliminated as in the present embodiment, such a problem may not arise.

Figure 8:
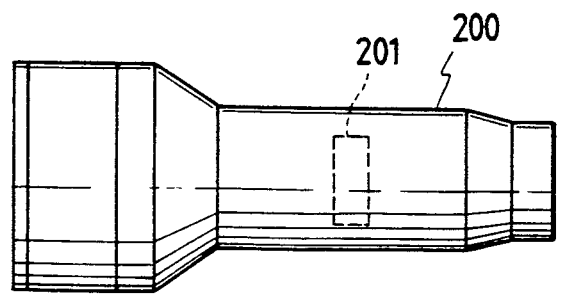
FIG. 8 is a pictorial view showing the speed controller of the embodiment as it is incorporated in an interchangeable lens.

FIG. 8 is a pictorial view showing the above-described speed controller as it is incorporated in an interchangeable lens 200.

Some modifications covered by the present invention will now be described.

First, the magneto-responsive element 15 shown in FIG. 1 has been described with respect to a Hall device, but any other element may be used if it is substantially capable of linear detection of the amount of rotation of the rotor (there are two types of such element, i.e., the type which directly detects the rotor itself and the type which detects a member driver by the rotor). A potentiometer, an MR device, etc. are conceivable as other elements.

Also, the control of the speed of the motor (the drive source) is not limited to the above-described light amount control, but the present invention can be applied to any system if it is a system for linearly detecting the amount of driving by the drive source. For example, by using the present invention for the speed control of a tracking servomotor in the optical pick-up system, damping can be prevented by a very simple construction. As another application, the present invention can be used for the speed control of a head seek servomotor to improve the excessive response by the speed control.

We claim:

1. An instrument having a speed controller, comprising:

a motor including a magnetized rotor;

a light amount varying device driven by less than one full rotation of said rotor of said motor;

speed setting means for setting driving speed information of said motor by the output of a light amount detecting device;

driving means for rotatably driving said rotor of said motor on the basis of said driving speed information set by said speed setting means;

detection means for linearly detecting the amount of rotation less than one full rotation of said motor to generate movement amount information;

control means for controlling the movement of an optical member by the use of said movement amount information obtained by said detection means; and correcting means for correcting said driving speed information by the use of the movement amount information obtained by said detecting means, said correcting means imparting new driving speed information as the corrected value to said driving means.

2. An instrument according to claim 1, wherein said rotor is rotatably driven by a driving coil.

3. An instrument according to claim 2, wherein a Hall device is used as said detection means, and the movement of the magnetic poles of said rotor is obtained as linearly varying voltage information.

4. An instrument according to claim 3, wherein said correcting means includes a differential amplifier, wherein a voltage value is used as said driving speed information, wherein the voltage value used as said driving speed information and a voltage value obtained by differentiating said movement amount information are input to said differential amplifier, thereby generating said corrected new driving speed information.

5. An instrument according to claim 3, wherein said correcting means makes said new driving speed information for smoothing the value of the speed of said driving speed information, thereby preventing hunting by a sudden variation in the amount of light caused by said light amount varying device.

6. An instrument according to claim 1, wherein said speed setting means compares the output of said light amount varying device with a reference value and forms the driving speed information of said motor on the basis of the difference therebetween.

7. An instrument according to claim 6, wherein said control means controls the movement of a lens as an optical member by the use of said movement amount information obtained by said detection means.

* * * * *

UNITED STATES PATENT AND TRADEMARK OFFICE
CERTIFICATE OF CORRECTION

PATENT NO. : 5,072,162

DATED : December 10, 1991

INVENTOR(S) : OSAMU SATO, ET AL.

It is certified that error appears in the above-identified patent and that said Letters Patent is hereby corrected as shown below:

On the title page:

At [57], "corretor" should read -- corrector --; and

COLUMN 1

Line 34, "(result" should read -- result --.

COLUMN 2

Line 25, "magnet" should be deleted.

COLUMN 5

Line 4, "optical axis x," should read -- optical axis X, --;

Line 8, "in focus" should read -- in-focus --;

Line 53, "iris driving motor unit 40," should read -- iris driving motor unit 140, --; and

UNITED STATES PATENT AND TRADEMARK OFFICE
CERTIFICATE OF CORRECTION

PATENT NO. : 5,072,162

DATED : December 10, 1991

INVENTOR(S) : OSAMU SATO, ET AL.

It is certified that error appears in the above-identified patent and that said Letters Patent is hereby corrected as shown below:

<u>COLUMN 6</u>

Line 16, "driver" should read -- driven --.

Line 43, change "motor" to -- rotor --.

Line 51, change "detecting" to -- detection --.

Signed and Sealed this

Eighth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,072,162
DATED : December 10, 1991
INVENTOR(S) : OSAMU SATO, et al.

It is certified that error appears in the above-indentified patent and that said Letters Patent is hereby corrected as shown below:

Title page:

At [73], "Canon Kabushiki Kaisha, Tokyo, Japan" should read --Canon Denshi Kabushiki Kaisha, Chichibu, Japan--.

Signed and Sealed this

Second Day of May, 1995

Attest:

BRUCE LEHMAN

*Attesting Officer*          *Commissioner of Patents and Trademarks*